(12) United States Patent
Marchildon et al.

(10) Patent No.: US 8,814,281 B2
(45) Date of Patent: Aug. 26, 2014

(54) SYSTEM AND METHOD FOR TENSIONING A TRACTION BAND AND TRACTION ASSEMBLY THEREWITH

(75) Inventors: Louis-Frederic Marchildon, St-Charles de Drummond (CA); Patrick L'Herault, Drummondville (CA)

(73) Assignee: Soucy International Inc., Drummondville (CA)

( * ) Notice: Subject to any disclaimer, the term of this patent is extended or adjusted under 35 U.S.C. 154(b) by 400 days.

(21) Appl. No.: 13/166,284

(22) Filed: Jun. 22, 2011

(65) Prior Publication Data

US 2012/0326496 A1     Dec. 27, 2012

(51) Int. Cl.
*B62D 55/30*     (2006.01)
*B62D 55/14*     (2006.01)

(52) U.S. Cl.
CPC ............... *B62D 55/30* (2013.01); *B62D 55/14* (2013.01)
USPC ........................................................ 305/143

(58) Field of Classification Search
USPC ......... 305/124, 125, 128, 129, 130, 132, 133, 305/142, 143
See application file for complete search history.

(56) References Cited

U.S. PATENT DOCUMENTS

| | | | | |
|---|---|---|---|---|
| 2,267,740 A * | 12/1941 | Knox | ............................. | 474/112 |
| 2,466,029 A * | 4/1949 | Knox et al. | .................... | 305/153 |
| 2,774,638 A * | 12/1956 | Spanjer | .......................... | 305/153 |
| 3,216,520 A * | 11/1965 | Blonsky | ........................ | 180/9.25 |
| 3,912,335 A * | 10/1975 | Fisher | ............................ | 305/148 |
| 4,227,749 A * | 10/1980 | Hesse | ............................. | 305/154 |
| 4,881,786 A * | 11/1989 | Tonsor | ........................... | 305/145 |
| 5,829,848 A * | 11/1998 | Kelderman | ..................... | 305/15 |
| 5,927,412 A * | 7/1999 | Crabb | ........................... | 180/9.44 |
| 6,860,571 B2 * | 3/2005 | Scheetz | .......................... | 305/143 |
| 7,296,862 B2 * | 11/2007 | Albright et al. | ................ | 305/145 |
| 7,520,575 B2 * | 4/2009 | Johnson | ......................... | 305/144 |
| 2002/0171289 A1 * | 11/2002 | Boyum | .......................... | 305/143 |
| 2012/0161511 A1 * | 6/2012 | Brazier | .......................... | 305/178 |

* cited by examiner

*Primary Examiner* — S. Joseph Morano
*Assistant Examiner* — Jean Charleston
(74) *Attorney, Agent, or Firm* — Brouillette & Partners; Robert Brouillette

(57) ABSTRACT

A system and a method for controllably tensioning a traction band mounted to a traction assembly, and a traction assembly comprising such a system, are disclosed. The system is typically mounted at the front or at the rear of the support frame of the traction assembly such as to support one or more idler wheels. The tensioning system generally comprises a clamping ring assembly having received therein a rotatable cylindrical member. The cylindrical member supports an axle which is eccentrically located with respect to the center axis of the cylindrical member, and which pivotally supports one or more idler wheels. By rotating the cylindrical member within the clamping ring assembly using a torquing tool, the tension of the traction band about the wheels (i.e. drive wheel, idler wheels, and support wheels) of the traction assembly can be controllably adjusted.

19 Claims, 9 Drawing Sheets

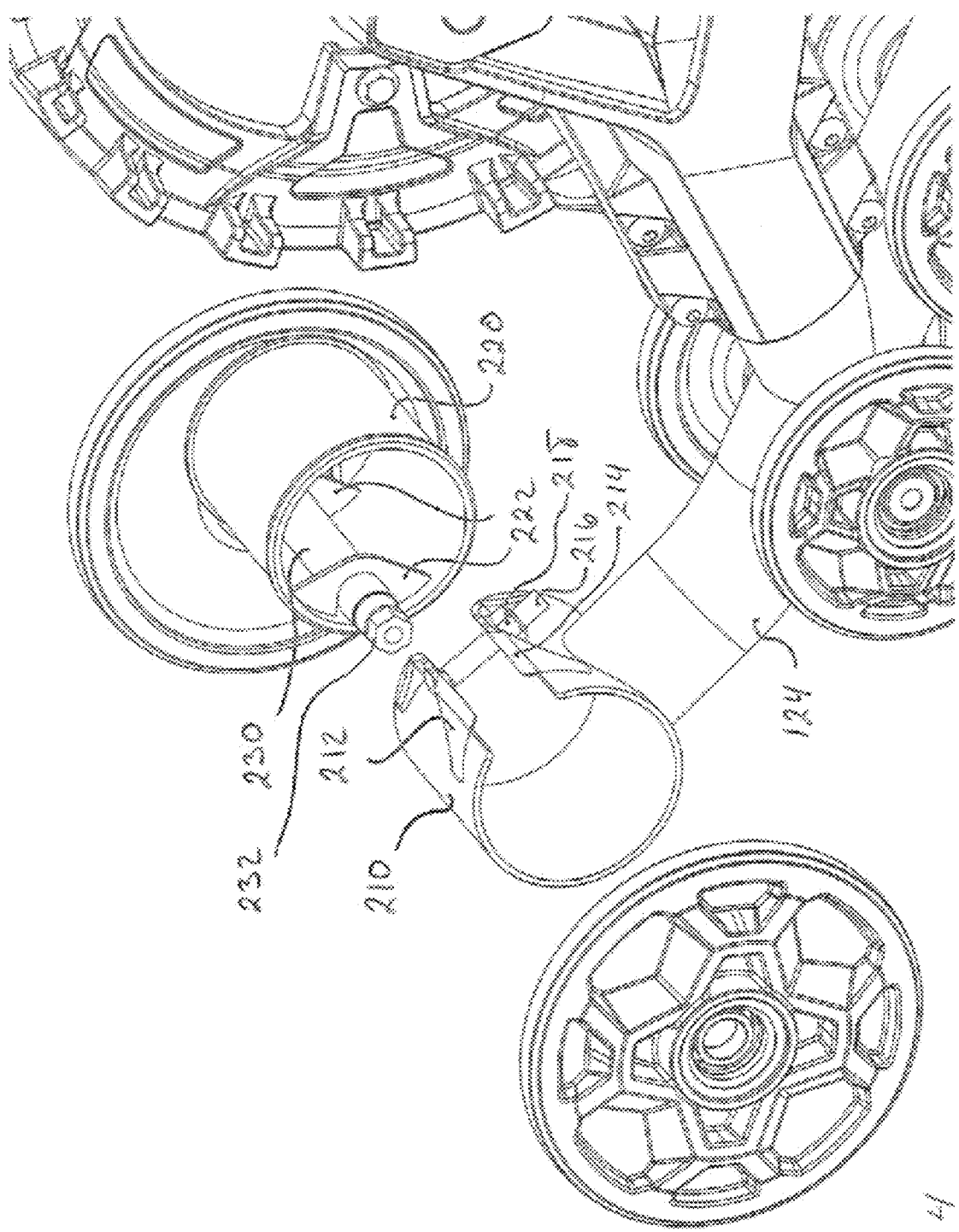

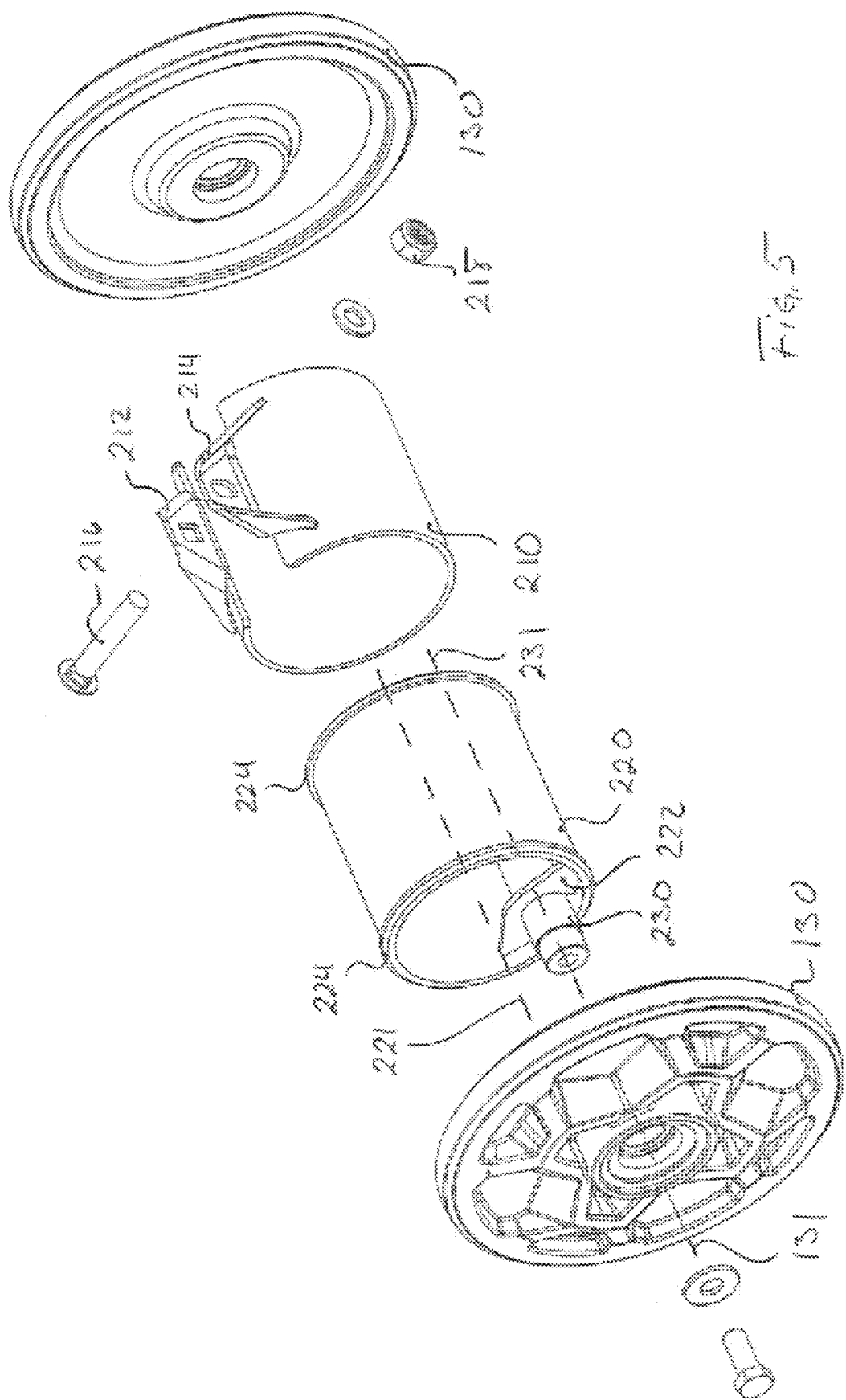

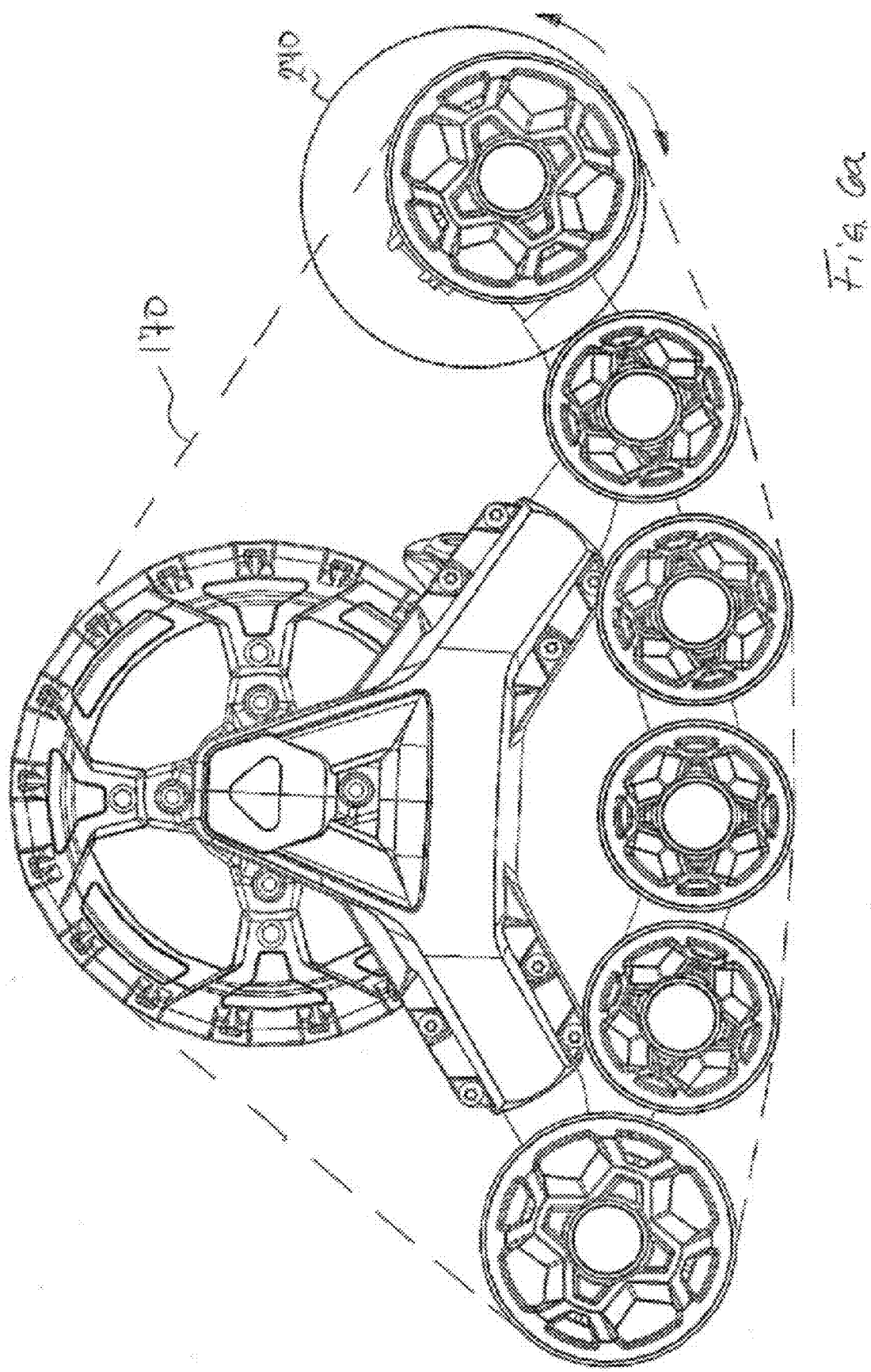

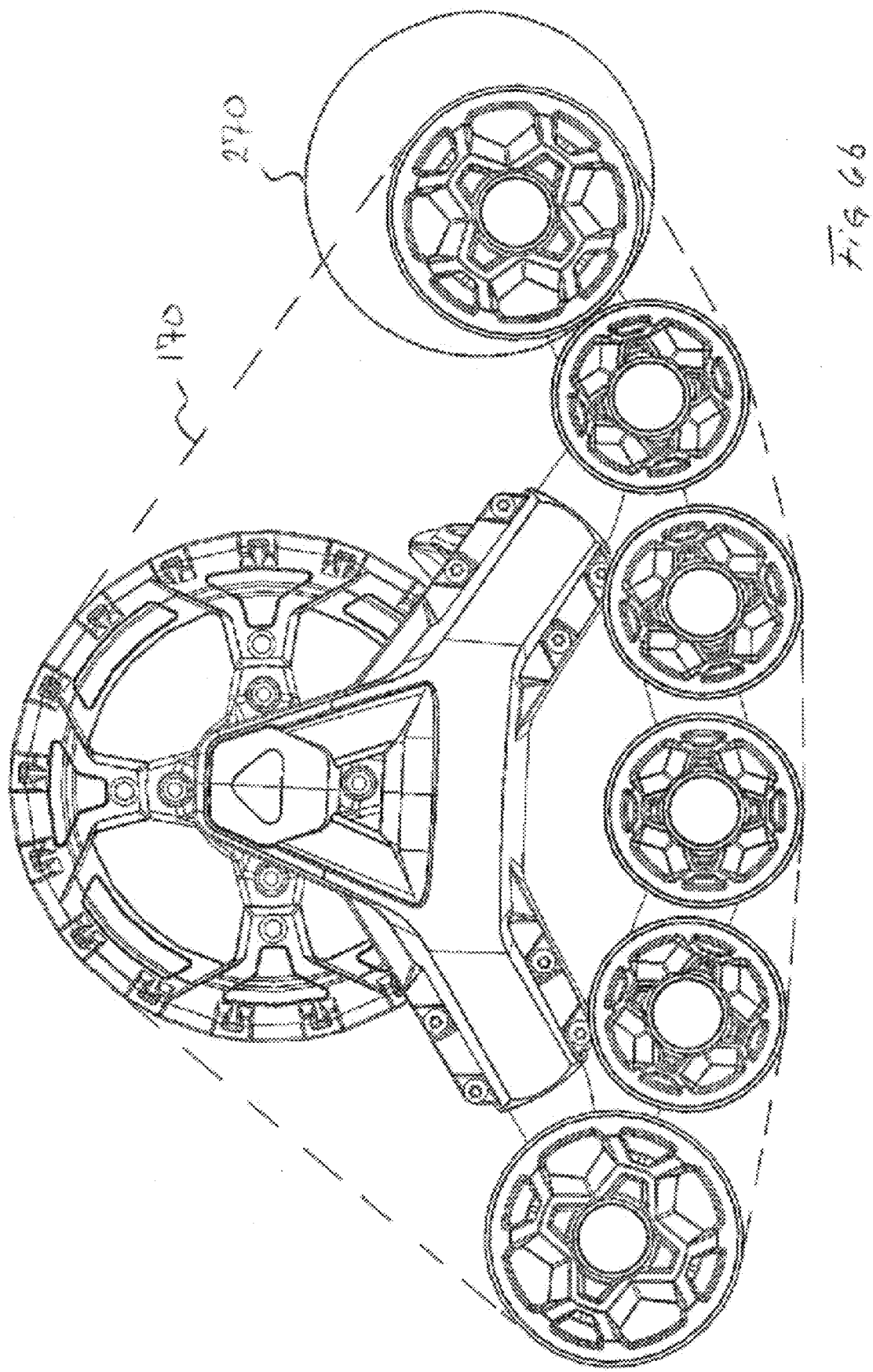

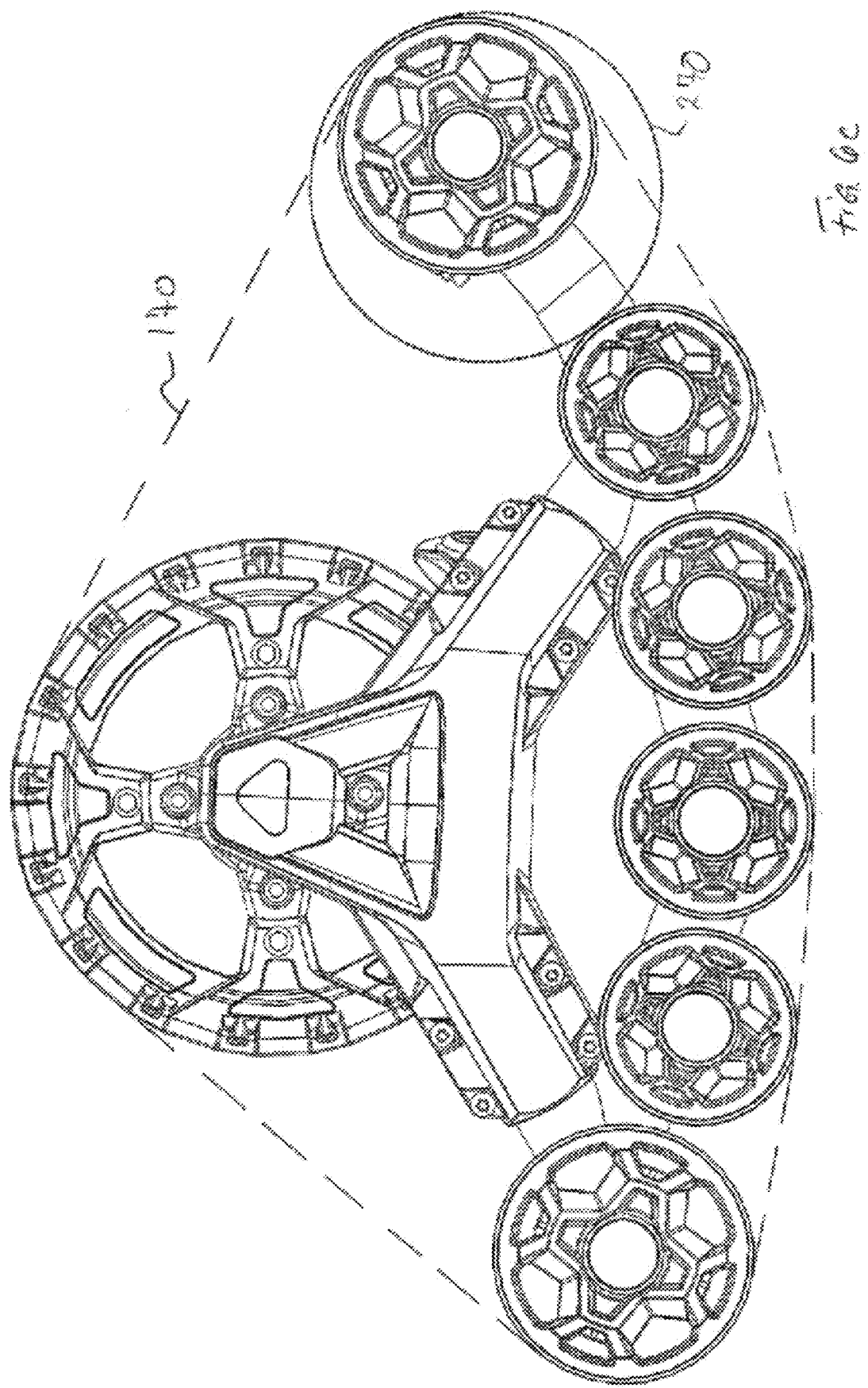

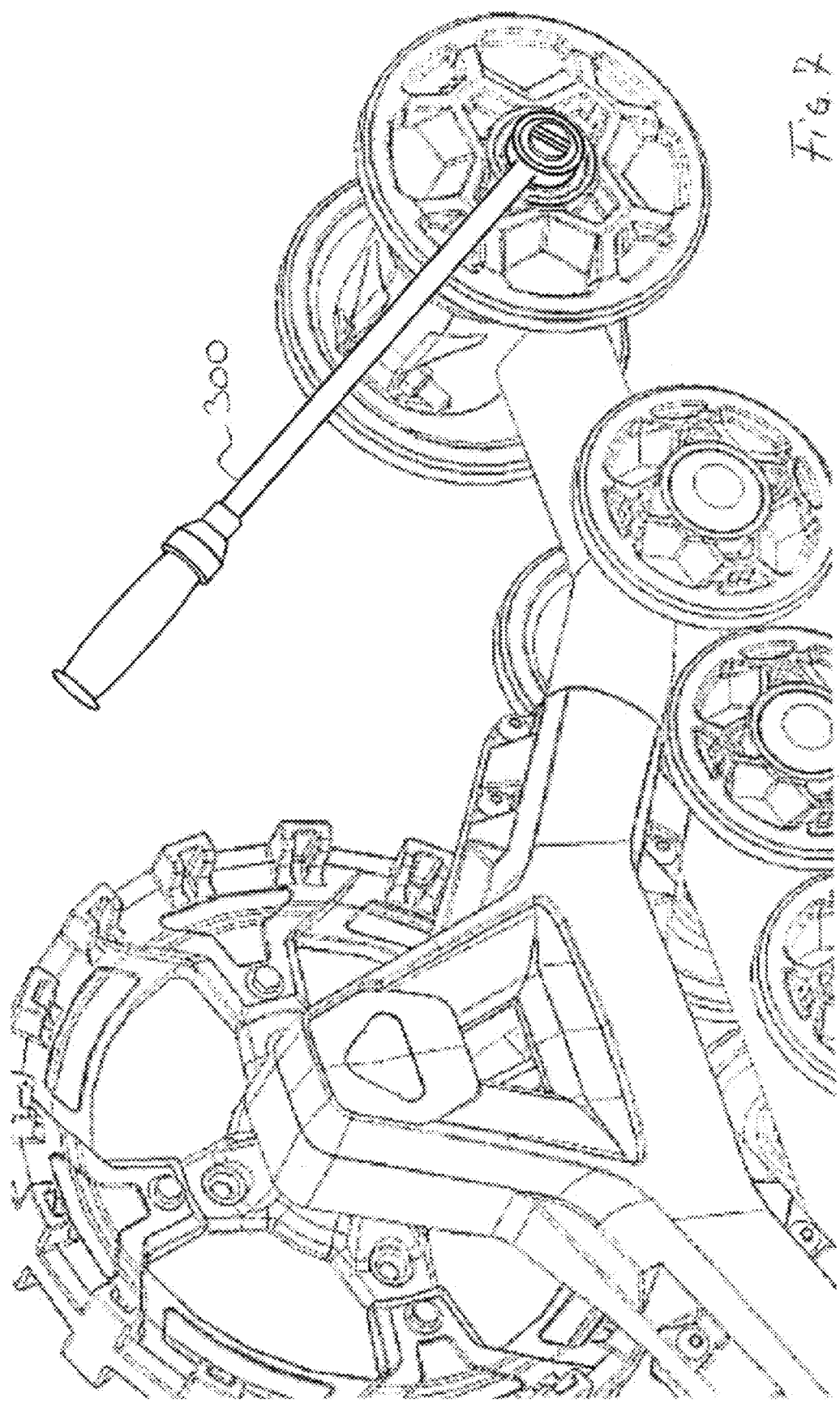

SYSTEM AND METHOD FOR TENSIONING A TRACTION BAND AND TRACTION ASSEMBLY THEREWITH

CROSS-REFERENCE TO RELATED APPLICATIONS

There are no cross-related applications.

FIELD OF THE INVENTION

The present invention generally relates to traction assemblies and more particularly to systems and methods for tensioning the traction band of such traction assemblies.

BACKGROUND OF THE INVENTION

Nowadays, there are an ever-increasing number of people who enjoy riding all-terrain vehicles and other similar off-road vehicles. In order to further adapt these vehicles to the increasing variety of terrains and surfaces onto which they are ridden, wheel-replacing traction assemblies have been developed to be used as replacement of the wheels of these vehicles.

Generally, a traction assembly uses an endless traction band for propulsion and comprises a more or less complex supporting frame, a drive wheel, idler wheels, support wheels, and the endless traction band disposed around the wheels and cooperating therewith. By using an endless traction band instead of a regular tire, a traction assembly generally provides increased floatation and better traction to the vehicle since the traction band spreads the weight of the vehicle over a larger area.

However, in order for the traction assembly to function properly, the endless traction band must be correctly mounted to and tensioned around the wheels of the traction assembly. On the one hand, if the tension in the traction band is too low, the traction band may detract from the wheels and fall off the traction assembly or lugs provided on the inner surface of the traction band may skip or disengage from a drive wheel, such as a sprocket wheel. On the other hand, if the tension in the track is too high, the traction band may wear or break prematurely.

There is thus a need for a traction assembly comprising a system which would allow the tensioning of the traction band mounted on the traction assembly such that the traction band is properly tensioned.

SUMMARY OF THE INVENTION

The principles of the present invention are generally embodied in a tensioning system mounted to a traction assembly and which allows the traction band to be controllably tensioned by controllably rotating a cylindrical member supporting eccentrically mounted idler wheels.

Hence, a traction assembly in accordance with the principles of the present invention typically comprises a drive wheel configured to be mounted to the wheel hub or axle of the vehicle, a longitudinally extending support frame mounted either to the drive wheel or to the vehicle, idler wheels pivotally mounted at the front and at the rear of the support frame, support or road wheels mounted along the length of the support frame and longitudinally between the idler wheels, and a longitudinally extending endless traction band mounted around and cooperating with the drive wheel, the idler wheels and the support wheels.

The traction band is typically made from reinforced elastomeric material and is configured to be drivingly engaged by the drive wheel.

In accordance with the principles of the present invention, the traction assembly comprises a traction band tensioning system mounted to the support frame and configured to controllably tension the traction band around the wheels of the traction assembly.

The tensioning system is typically mounted at the front or at the rear of the support frame such as to support either the front idler wheels or the rear idler wheels.

In accordance with the principles of the present invention, the tensioning system comprises a clamping ring fixedly mounted to the support frame (e.g. by welding), or integral therewith. The clamping ring is closable by an adjustable fastener (e.g. bolt and nut, latch, worm screw, etc.). The tensioning system also comprises a cylindrical or tubular member received in the clamping ring. The cylindrical member is typically configured to be rotatable within the clamping ring when the latter is loosened and to be substantially fixed (i.e. substantially immobile) when the clamping ring is tightened. In that sense, the extremities of the cylindrical member typically respectively comprise radially extending circumferential flanges to prevent the cylindrical member to laterally slide out of the clamping ring.

The cylindrical member supports an axle which extends axially from the cylindrical member such as to pivotally support the idler wheels. The axle is eccentrically supported by the cylindrical member such that the center axis of the axle is not coextensive with the center axis of the cylindrical member.

The extremities of the axle are typically configured to be engageable by a torquing tool such as a torque wrench. In that sense, the extremities of the axle are typically, though not necessarily, hexagonal.

When the traction band is mounted around the wheels of the traction assembly, including the idler wheels supported by the axle supported by cylindrical member, it is possible to control the tension in the traction band by controllably rotating the cylindrical member within the clamping ring.

In that sense, as the cylindrical member is rotated within the clamping ring, the overall geometry of the wheels slightly changes due to the eccentricity of the axle supported by the cylindrical member and which supports idler wheels, and the overall perimeter defined by the periphery of the wheels also slightly changes. Hence, depending on the amount of rotation of the cylindrical member, the overall perimeter defined by the periphery of the wheels can be slightly increased or slightly decreased. As the traction band generally has a predetermined internal operating perimeter, when the overall perimeter of the periphery of the wheels is increased, the tension in the traction band also generally increases, and when the overall perimeter is decreased, the tension in the traction band also generally decreases.

In accordance with an aspect of the present invention, the tension in the traction band can be properly adjusted by using a torquing tool (e.g. a torque wrench) to rotate the cylindrical member and by stopping the rotation when a predetermined torque is reached. The predetermined torque can be provided in a table including, for examples, different predetermined torques for different traction bands, for different traction assemblies, for different traction assembly configurations, etc.

By simply using a torquing tool such as a torque wrench and a corresponding predetermined torque in a table, the operator of the vehicle to which the traction assembly is mounted can easily adjust the tension in the traction band to its proper operating value simply by loosening the clamping ring, rotating the cylindrical member until the predetermined torque is reached, and then tightening back the clamping ring to secure the cylindrical member at its new position.

Hence, a tensioning system in accordance with the principles of the present invention provides a way to tension a traction band on a traction assembly quickly and without the need for complex tools.

In addition, as the cylindrical member is held in the clamping ring by friction, the cylindrical member can rotate, even if the clamping ring is tightened, if subjected to a severe impact, therefore preventing or at least limiting damages to the traction assembly and/or to the tensioning system. Notably, prior art tensioning systems typically do not provide such damage avoidance mechanism.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 4 is a perspective exploded view of the tensioning system of FIG. 1.

FIG. 5 is a perspective exploded view of the tensioning system of FIG. 1, without the traction assembly.

FIGS. 6a to 6c are side views of the traction assembly of FIG. 1, without the traction band, and showing three different overall perimeters defined by the wheels of the traction assembly.

FIG. 7 is a fragmentary perspective view of the traction assembly of FIG. 1, showing an exemplary torquing tool engaging the tensioning system.

DETAILED DESCRIPTION OF THE PREFERRED EMBODIMENT

Novel system and method for tensioning a traction band and a traction assembly having such a system will be described hereinafter. Although the invention is described in terms of specific illustrative embodiments, it is to be understood that the embodiments described herein are by way of example only and that the scope of the invention is not intended to be limited thereby.

Figure 1:
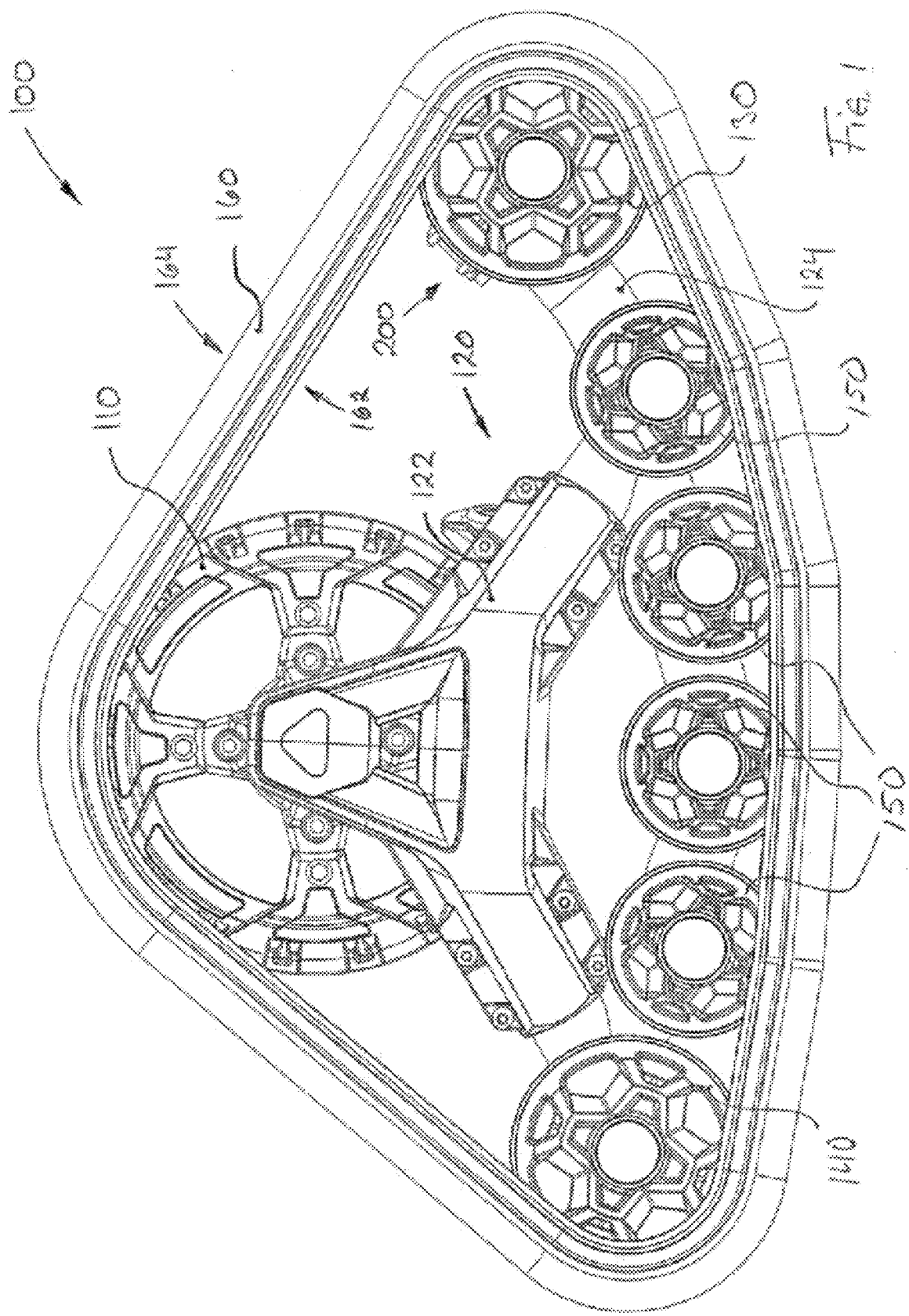
FIG. 1 is a side view of a traction assembly comprising a tensioning system in accordance with the principles of the present invention.

Referring first to FIG. 1, a traction assembly 100 comprising a tensioning system 200 in accordance with the principles of the present invention is illustrated. A traction assembly 100 as the one illustrated is typically used as a wheel replacement on a relatively small vehicle such as, but not limited to, an all-terrain vehicle ("ATV") or a utility-terrain vehicle ("UTV").

The traction assembly 100 generally comprises a drive wheel 110, a support frame 120, front idler wheels 130 and rear idler wheels 140 respectively pivotally mounted at the front and rear extremities of the frame 120, support wheels 150 pivotally mounted along the length of the frame 120, and an endless traction band 160 disposed around and cooperating with the various wheels 110, 130, 140 and 150 of the traction assembly 100.

The drive wheel 110 is configured to be mounted (or coupled) to the axle of the vehicle (not shown) such as to receive motive power therefrom. In the present embodiment, the drive wheel 110 is a sprocket wheel which is configured to drivingly engage drive lugs (not shown) provided on the inner surface 162 of the traction band 160.

The frame 120 is configured to be mounted either to the drive wheel 110 or directly to the chassis of the vehicle. In the present embodiment, the frame 120 is pivotally yet non-drivingly mounted to the drive wheel 110, typically via an assembly comprising a lateral support and bearings.

The endless traction band 160 is typically made from reinforced elastomeric material. The reinforcements are typically longitudinal (e.g. cords, cables, etc.), lateral (e.g. rods, bars, etc.), and/or both longitudinal and lateral (e.g. fabric(s), mesh(es), fibers, etc.).

As indicated above, the endless traction band 160 comprises an inner surface 162 configured to be drivingly engaged by the drive wheel 110, and an outer surface 164 configured to engage the ground. To that end, the outer surface 164 is generally provided with a treat pattern of ground-engaging lugs or profiles (not shown).

Since the traction band 160 is made from elastomeric material, the traction band 160 can sustain a certain amount of stretch in the longitudinally direction such the internal perimeter of the traction band 160 and the tension to which the traction band 160 is subjected can vary. However, the traction band 160 generally has a predetermined internal operating perimeter and a predetermined operating tension at which the traction band 160 should preferably operate. Such predetermined internal operating perimeter and predetermined operating tension are typically provided by the manufacturer of the traction band 160.

Referring back to FIGS. 1 and 2, the frame 120 comprises an upper frame portion 122 and a lower frame portion 124. As illustrated in FIG. 1, the lower frame portion 124 extends in a longitudinal direction and pivotally supports the idler wheels 130 and 140 and the support wheels 150.

Figure 2:
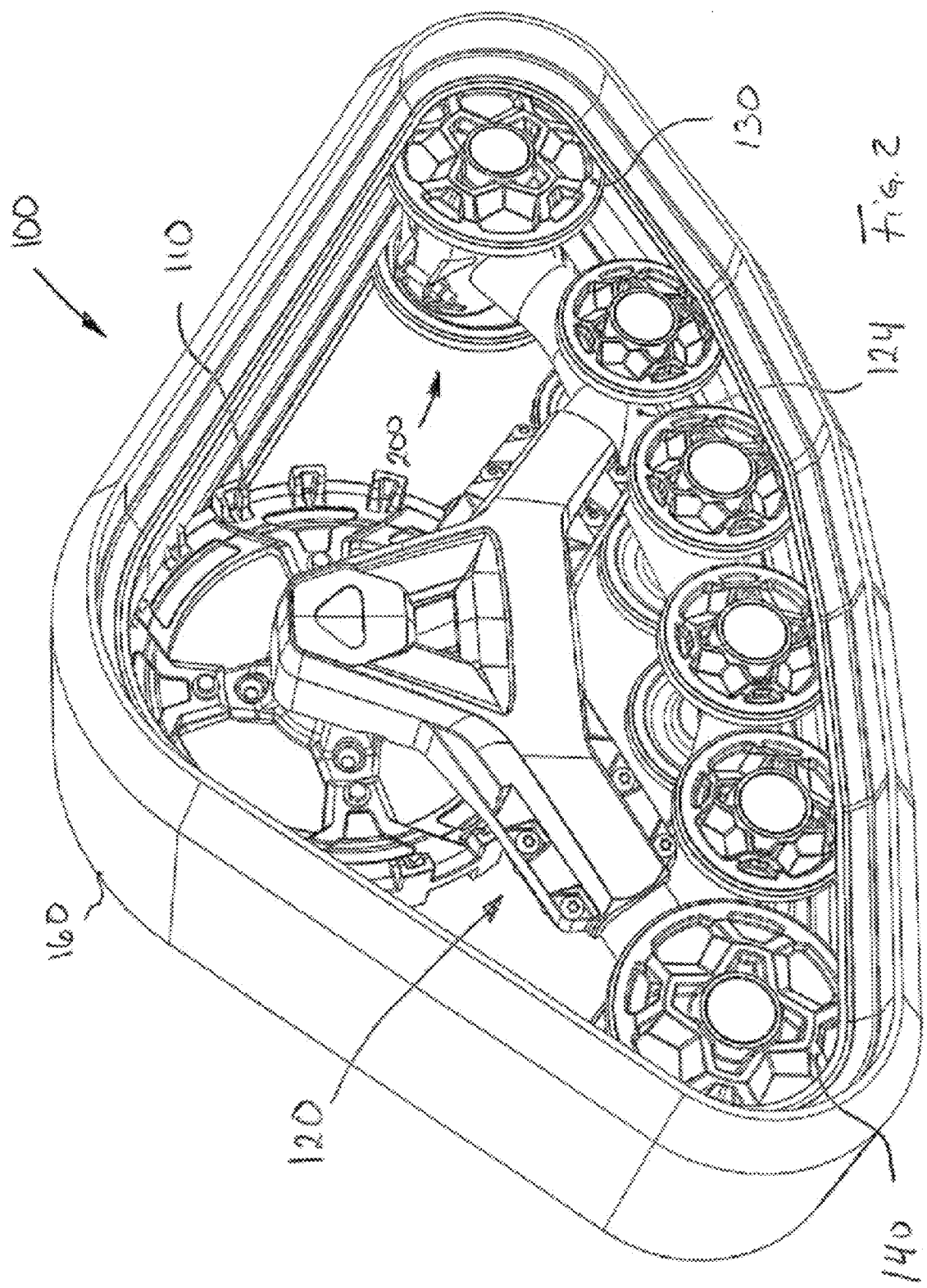
FIG. 2 is a perspective side view of a traction assembly of FIG. 1.

Referring now to FIG. 2, the traction assembly 100 also comprises a traction band tensioning system 200 mounted at one of the extremities of the lower frame portion 124. The tensioning system 200 can be fastened to the lower frame portion 124 or be integral therewith. In the present embodiment, the tensioning system 200 is welded to the lower frame portion 124, at the front extremity thereof.

Figure 3:
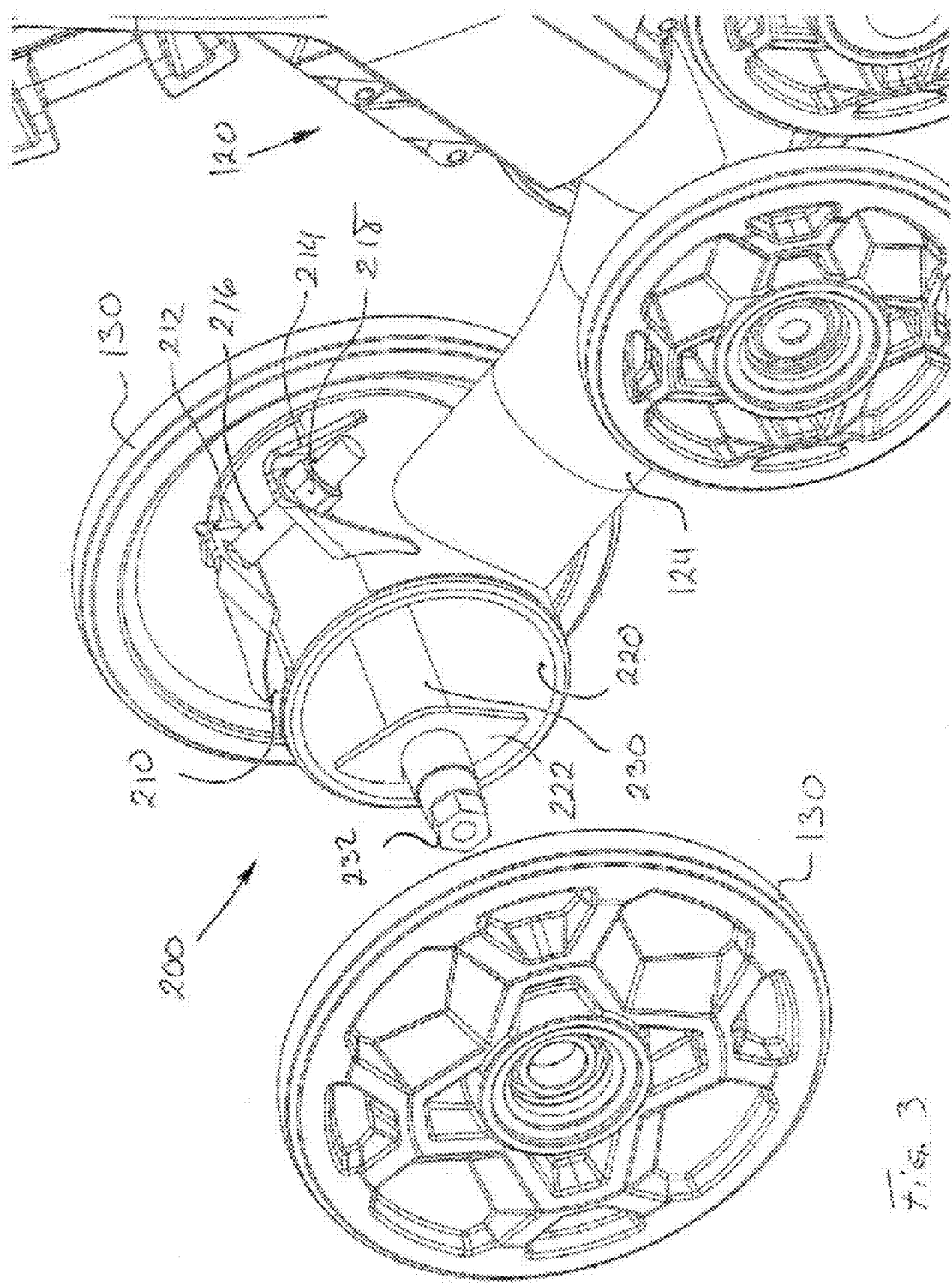
FIG. 3 is a perspective and enlarged view of the tensioning system of FIG. 1, with one of the idler wheels partially removed.

Referring now to FIGS. 3 to 5, the tensioning system 200 is configured to support the idler wheels 130 (or 140). In that sense, and as it will be better understood below, the tensioning system 200, in accordance with the principles of the present invention, works by changing the overall perimeter defined by the periphery of the wheels via the rotation of the idler wheels 130.

As shown in FIGS. 3 to 5, in the present embodiment, the tensioning system 200 generally comprises a clamping ring 210 which can be selectively tightened and loosened, and a cylindrical member 220 mounted for rotation within the clamping ring 210.

In the present embodiment, the clamping ring 210 can be selectively tightened and loosened via a bolt 216 and a nut 218 mounted to a pair of ears 212 and 214 as best illustrated in the FIG. 3. In other embodiments, the clamping ring 210 could be selectively tightened and loosened by a latch, by a worm drive, or by other functionally equivalent means.

As indicated above, the cylindrical member 220 is mounted for rotation within the clamping ring 210. In that sense, when the clamping ring 210 is loosened, the cylindrical member 220 is substantially free to rotate within the clamping ring 210. When the clamping ring 210 is tightened, the cylindrical member 220 is substantially fixed within the clamping ring 210.

The cylindrical member 220 is configured to pivotally support the idler wheels 130 (or 140). In that sense, the cylindrical member 220 supports an axle 230.

In the present embodiment, the cylindrical member 220 is a tubular member 220 and the axle 230 is secured into the tubular member 220 via a pair of protrusions or ribs 222 extending from the inner wall of the tubular member 220. The axle 230 further axially extends from the tubular member 220 as best shown in FIG. 4.

Referring more particularly to FIG. 5, to prevent the cylindrical member 220 from laterally sliding out of the clamping ring 210, the cylindrical member 220 typically comprises circumferential flanges 224 extending radially at each extremity of the cylindrical 220.

The axle 230 is mounted to or supported by the cylindrical member 220 such that the center axis 231 of the axle 230 is offset, i.e. not coextensive, with respect to the center axis 221 of the cylindrical member 220. Having the center axis 231 of the axle 230 offset from the center axis 221 of the cylindrical member 220 allows the rotation axis 131 of the idler wheels 130, which is coextensive with the center axis 231, to rotate about the center axis 221 of the cylindrical member 220 when the cylindrical member 220 is rotated within the clamping ring 210.

In that sense, the axle 230 and the cylindrical member 220 are fixedly jointed together such that a movement imparted to the axle 230 is transmitted to the cylindrical member 220.

To rotate the cylindrical member 220 within the clamping ring 210 (when the clamping ring 210 is loosened), one or both extremities 232 of the axle 230 are configured to be engageable by a torquing tool such as a torque wrench as shown in FIG. 7. In the present embodiment, as shown in FIGS. 3 and 4, the extremity 232 of the axle 230 is configured as a hexagonal head.

Understandably, by rotating the cylindrical member 220 within the clamping ring 210, the overall perimeter 170 defined by the periphery of the wheels (e.g. drive wheel 110, idler wheels 130 and 140, and support wheels 150) of the traction assembly 100 can be modified.

When the traction band 160 is mounted around the wheels of the traction assembly 100 as in FIG. 1, including the idler wheels 130 supported by the axle 230, the traction band 160 must follow the overall perimeter 170 defined by the periphery of the wheels. However, as indicated above, the traction band 160 typically has a predetermined internal operating perimeter and a predetermined operation tension.

Hence, with the tensioning system 200, it is possible to controllably adjust the tension in the traction band 160 to its proper operating tension by controllably rotating the cylindrical member 220 within the clamping ring 210.

Referring to FIGS. 6a to 6c, different overall perimeters 170 defined by the periphery of the wheels are illustrated in dotted lines.

Starting from FIG. 6a, as the cylindrical member 220 is rotated within the clamping ring 210, either in a clockwise direction (toward FIG. 6b) or in a counter-clockwise direction (toward FIG. 6c), the overall perimeter 170 defined by the periphery of the wheels slightly changes due to the eccentricity of the axle 230 supported by the cylindrical member 220, and supporting the idler wheels 130. Hence, depending on the amount of rotation imparted to the cylindrical member 220, the overall perimeter 170 can be slightly decreased (as in FIG. 6b where the idler wheels 130 are located more rearwardly) or slightly increased (as in FIG. 6c where the idler wheels 130 are located more forwardly). When the overall perimeter 170 is decreased, the tension in the traction band 160 also tends to decrease, whereas when the overall perimeter 170 is increased, the tension in the traction band 160 also tends to increase.

Understandably, the range over which the overall perimeter 170 can change is limited by the amplitude of rotation that can be imparted to the cylindrical member 220. This amplitude is also limited by the distance between the center axes 221 and 231 and by the diameter of the idler wheels 130. In the present embodiment, these two parameters provide the circular range 270.

In accordance with an aspect of the present invention, the tension in the traction band 160 can be properly adjusted by using a torquing tool such as, but not limited to, a torque wrench, to rotate the cylindrical member 220 and by stopping the rotation when a predetermined torque is reached.

The predetermined torque can be provided in a table including, for examples, different predetermined torques for different traction bands, for different traction assemblies, for different traction assembly configurations, etc. Typically, the predetermined torque would be provided in a table comprising different predetermined torques for different traction bands.

Referring now to FIG. 7, by simply using a torquing tool such as a torque wrench 300 and a corresponding predetermined torque in a table, the operator of the vehicle to which the traction assembly 100 is mounted can easily adjust the tension in the traction band 160 to its proper operating tension simply by loosening the clamping ring 210, rotating the cylindrical member 220, via the engageable head 232, until the predetermined torque for the particular traction band 160 is reached, and then tightening back the clamping ring 210 to secure the cylindrical member 220 at its new position.

Hence, the tensioning system 200 in accordance with the principles of the present invention provides a way to tension the traction band 160 mounted on the traction assembly 100 quickly and without the need for complex tools.

Furthermore, using a torquing tool such as a torque wrench 300 and a correspondence table between predetermined torque values and predetermined operating tensions for different traction bands 160, the tensioning system 200 in accordance with the principles of the present invention allows for a precise adjustment of the tension of the traction band 160.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A traction assembly for use on a vehicle, the traction assembly comprising:
    a) a drive wheel configured to be mounted to the vehicle;
    b) a support frame comprising a first extremity and a second extremity, the support frame comprising a tensioning mechanism located at one of the first and second extremities, the tensioning mechanism comprising a clamping member rotatably supporting therein a rotating member having a central rotation axis;

c) first idler wheels pivotally mounted to the rotating member, the first idler wheels having a first idler wheel rotation axis, the first idler wheel rotation axis being eccentric with respect to the rotation axis of the rotating member;

d) second idler wheels pivotally mounted at the other of the first and second extremities of the support frame;

e) support wheels pivotally mounted to the support frame;

f) a traction band disposed about the drive wheel, the idler wheels and the support wheels;

wherein the drive wheel, the idler wheels and the support wheels define an overall perimeter;

wherein rotation of the rotating member within the tensioning mechanism causes a displacement of the first idler wheels about the rotating member rotation axis; and wherein the displacement of the first idler wheels causes the overall perimeter to change, thereby changing the tension in the traction band.

2. A traction assembly as claimed in claim 1, wherein the clamping member is configured to be selectively tightened and loosened.

3. A traction assembly as claimed in claim 1, wherein the rotating member is substantially cylindrical.

4. A traction assembly as claimed in claim 3, wherein the rotating member comprises radial flanges at each extremity thereof.

5. A traction assembly as claimed in claim 1, wherein the rotating member allows the first idler wheels to be displaced within a circular range.

6. A traction assembly as claimed in claim 1, wherein the rotating member comprises an axle which supports the first idler wheels, the axle having a first and a second extremities, at least one of the first and second extremities being engageable by a tool.

7. A traction assembly as claimed in claim 6, wherein the at least one of the first and second extremities which is engageable by a tool is configured as a hexagonal head.

8. A traction assembly as claimed in claim 6, wherein the tool is a torquing tool.

9. A traction assembly as claimed in claim 8, wherein the torquing tool is a torque wrench.

10. A traction assembly as claimed in claim 1, wherein the first end of the support frame is a front end thereof, and wherein the second end of the support frame is a rear end thereof.

11. A traction assembly for use on a vehicle, the traction assembly comprising:

a) a drive wheel configured to be mounted to the vehicle;

b) a support frame comprising a first extremity and a second extremity, the support frame comprising a tensioning mechanism located at one of the first and second extremities, the tensioning mechanism comprising a clamping member pivotally supporting therein a rotating member having a central rotation axis;

c) first idler wheels pivotally mounted to the rotating member, the first idler wheels having a first idler wheel rotation axis, the first idler wheel rotation axis being eccentric with respect to the rotation axis of the rotating member;

d) second idler wheels pivotally mounted at the other of the first and second extremities of the support frame;

e) support wheels pivotally mounted to the support frame;

f) a traction band disposed about the drive wheel, the idler wheels and the support wheels;

wherein the drive wheel, the idler wheels and the support wheels define an overall perimeter;

wherein the traction band is controllably tensioned by rotating the rotating member within the tensioning mechanism to displace the first idler wheels about the rotating member rotation axis and change the overall perimeter defined by the wheels.

12. A traction assembly as claimed in claim 11, wherein the clamping member is configured to be selectively tightened and loosened.

13. A traction assembly as claimed in claim 11, wherein the rotating member is substantially cylindrical.

14. A traction assembly as claimed in claim 13, wherein the rotating member allows the first idler wheels to be displaced within a circular range.

15. A traction assembly as claimed in claim 13, wherein the rotating member comprises radial flanges at each extremity thereof.

16. A traction assembly as claimed in claim 13, wherein the rotating member comprises an axle which supports the first idler wheels, the axle having a first and a second extremities, at least one of the first and second extremities being engageable by a tool.

17. A traction assembly as claimed in claim 16, wherein the at least one of the first and second extremities which is engageable by a tool is configured as a hexagonal head.

18. A traction assembly as claimed in claim 16, wherein the tool is a torquing tool.

19. A traction assembly as claimed in claim 18, wherein the torquing tool is a torque wrench.

* * * * *